Dec. 13, 1960 A. J. BUTTERWORTH 2,964,118
PARKING DEVICES FOR MOTOR VEHICLES
Filed April 16, 1956 9 Sheets-Sheet 1

Fig. 1.

INVENTOR
ARCHIBALD JAMES
BUTTERWORTH
By Young, Emery & Thompson
ATTYS.

Dec. 13, 1960  A. J. BUTTERWORTH  2,964,118
PARKING DEVICES FOR MOTOR VEHICLES
Filed April 16, 1956  9 Sheets-Sheet 2

INVENTOR
ARCHIBALD J. BUTTERWORTH
BY Young, Emery & Thompson
ATTYS.

Dec. 13, 1960 A. J. BUTTERWORTH 2,964,118
PARKING DEVICES FOR MOTOR VEHICLES
Filed April 16, 1956 9 Sheets-Sheet 3

Fig.3.

INVENTOR
ARCHIBALD J. BUTTERWORTH
BY Young, Emery & Thompson
ATTYS.

Dec. 13, 1960 A. J. BUTTERWORTH 2,964,118
PARKING DEVICES FOR MOTOR VEHICLES
Filed April 16, 1956 9 Sheets-Sheet 4

INVENTOR
ARCHIBALD J. BUTTERWORTH

Dec. 13, 1960     A. J. BUTTERWORTH     2,964,118
PARKING DEVICES FOR MOTOR VEHICLES
Filed April 16, 1956                                        9 Sheets-Sheet 5

INVENTOR
ARCHIBALD J. BUTTERWORTH
By Young, Emery & Thompson
ATTYS.

Dec. 13, 1960 A. J. BUTTERWORTH 2,964,118
PARKING DEVICES FOR MOTOR VEHICLES
Filed April 16, 1956 9 Sheets-Sheet 8

Dec. 13, 1960 A. J. BUTTERWORTH 2,964,118
PARKING DEVICES FOR MOTOR VEHICLES
Filed April 16, 1956 9 Sheets-Sheet 9

INVENTOR
ARCHIBALD J. BUTTERWORTH
By Young, Emery & Thompson
ATTYS.

United States Patent Office 2,964,118
Patented Dec. 13, 1960

2,964,118

PARKING DEVICES FOR MOTOR VEHICLES

Archibald James Butterworth, Frimley, near Aldershot, England, assignor to Sidler Limited, London, England, a British company Filed Apr. 16, 1956, Ser. No. 578,351

Claims priority, application Great Britain Apr. 19, 1955

20 Claims. (Cl. 180—1)

This invention relates to parking devices for motor vehicles and has for one of its objects to provide means whereby the parking of motor vehicles and maneuvering them in restricted spaces is facilitated. With increasing traffic congestion the problem of finding, and making the best use of parking space in city streets is becoming increasingly severe. Every motorist who has business in cities is likely to suffer irritation and delay almost daily by being confronted with a space between two parked vehicles into which his car could well fit if only he could "tuck the tail in." The same difficulty constantly occurs when another vehicle driver backs close up to the front of a car which has an obstruction to its rear.

According to this invention a parking mechanism for a motor vehicle is characterised in that there is associated with either or each end of the vehicle means capable of lifting both wheels at one end of the vehicle or all the vehicle wheels out of contact with or nearly out of contact with the ground while the part of the lifting means that engages the ground is provided with one or more rollers or the like so mounted as to permit said vehicle being moved laterally.

Preferably the lifting means is associated with the back axle of the vehicle, since lateral movement of the front of a conventionally constructed motor car does not present any great difficulty and thus in most instances it may be unnecessary to provide the front of the vehicle with said lifting means.

The lifting means and/or said roller or rollers may be power operated.

It will be appreciated that with this arrangement a driver can drive the front end of a car into a restricted space first leaving the tail jutting out whereafter he sets the power operated lifting mechanism into operation which lifts the rear wheels off the ground and he then sets into operation the power operated rollers whereby the tail of the car is moved laterally until the car is facing in a fore and aft direction.

The power source may be derived from the engine of the vehicle, through a pneumatic, hydraulic, mechanical or electric transmission.

A suitable motor for driving the roller or rollers may be accommodated in the lifting mechanism.

The movable part of the lifting means may be actuated by a ram energised by compressed air or vacuum or may be operated hydraulically or electrically.

Two such lifting means may be associated with the back axle on either side of the usual differential so that when in an extended position a roller or rollers are disposed adjacent each rear wheel.

In one construction according to the invention the arrangement is such that when the lifting means is in an extended position and has lifted the wheels the aforesaid rollers contact with the sides or the treads of the tires, and are so shaped and mounted that they are driven by the road wheels and in so doing roll laterally along the road surface.

It will be appreciated that the above device may also be used as an automatic jacking system on each of the four wheels or on the two rear wheels only, since most tire trouble occurs on rear wheels. For this purpose, means are provided for limiting the movement of the rollers laterally towards the tires so as to retain them out of contact, and means may also be provided for locking the rollers against rotation.

The following is a more detailed description of a number of embodiments of the invention, reference being made to the accompanying drawings in which.

Figure 1:
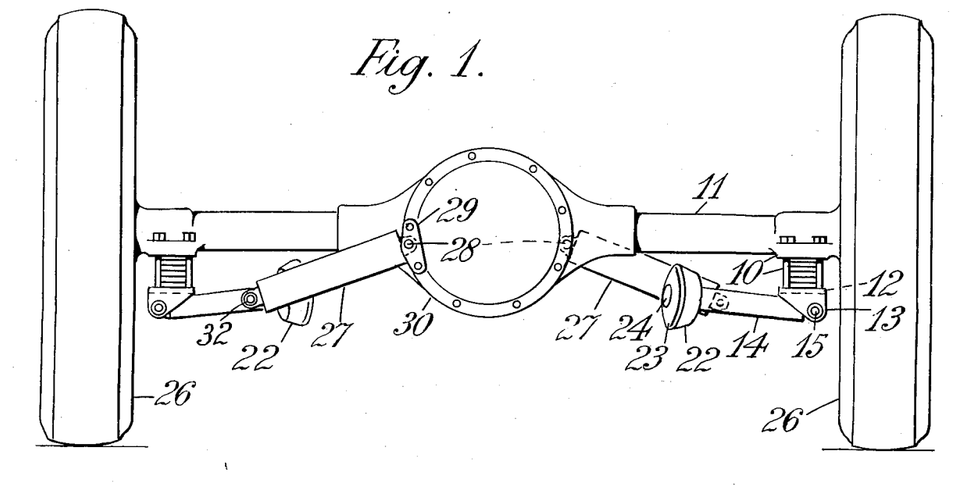
Figure 1 is a rear elevation of the vehicle showing the mechanism in a retracted position.
Figure 2:
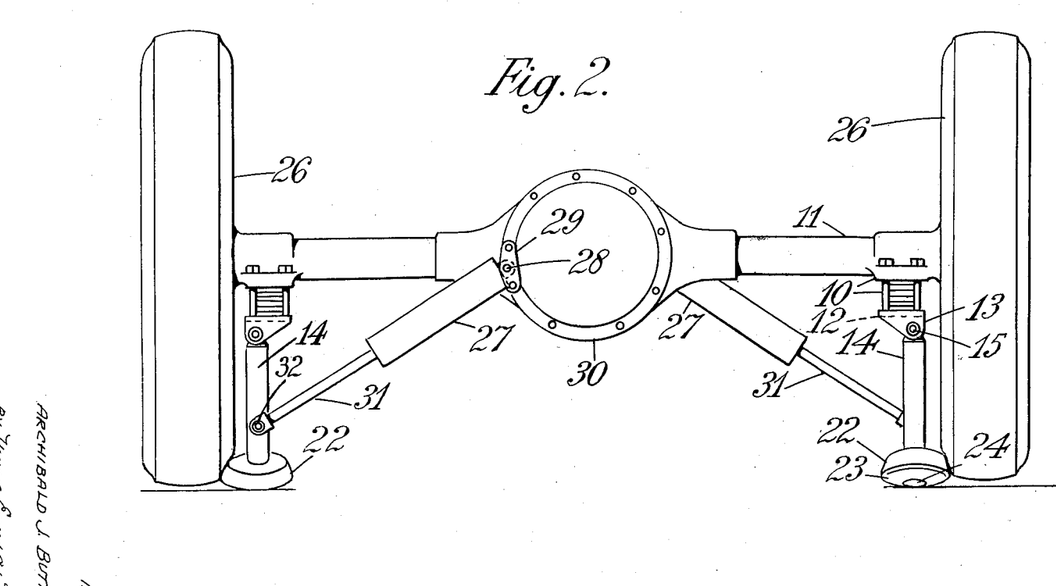
Figure 2 is a similar view to Figure 1 showing the mechanism in an extended position.

In one arrangement shown in Figures 1 and 2 according to the invention the spring anchorage 10 at each end of the rear axle 11 is provided on the underside thereof with a bracket 12 comprising two downwardly extending lugs 13 between which an arm 14 is pivoted to swing about a substantially horizontal fore and aft extending pivot pin 15. The lower end of each arm is provided with a roller comprising a peripheral portion 22 which is conical while the under face 23 is domed and has a central depression 24. Alternatively, it could be conical and provided with a flat or recessed central portion. The axis of the roller as viewed from the side of the vehicle is inclined upwardly and forwardly whereas on the near side of the vehicle the axis of the roller is inclined upwardly and rearwardly. A bearing 16 mounted in the lower extremity of each arm journals a spindle 17 to which the roller is secured. A circumferential groove 20 in the spindle 17 receives a retaining ring 19 for maintaining the spindle in assembled relationship in the bearing. If the arms 14 are then forced outwardly so as to bring the conical surfaces 22 of the rollers into engagement with the tires and the operator then engages the first gear so as to rotate the road wheels the rollers will also rotate moving the whole vehicle laterally. By reason of the inclination of the aforesaid rollers the axes of rotation of the rollers will, as viewed from the side of the vehicle, be inclined at about 15° to the vertical whereas as viewed from the rear they will be substantially vertical. This disposition causes the vehicle to be moved sideways when the rollers are rotated.

Figures 9, 10, 14, 15:
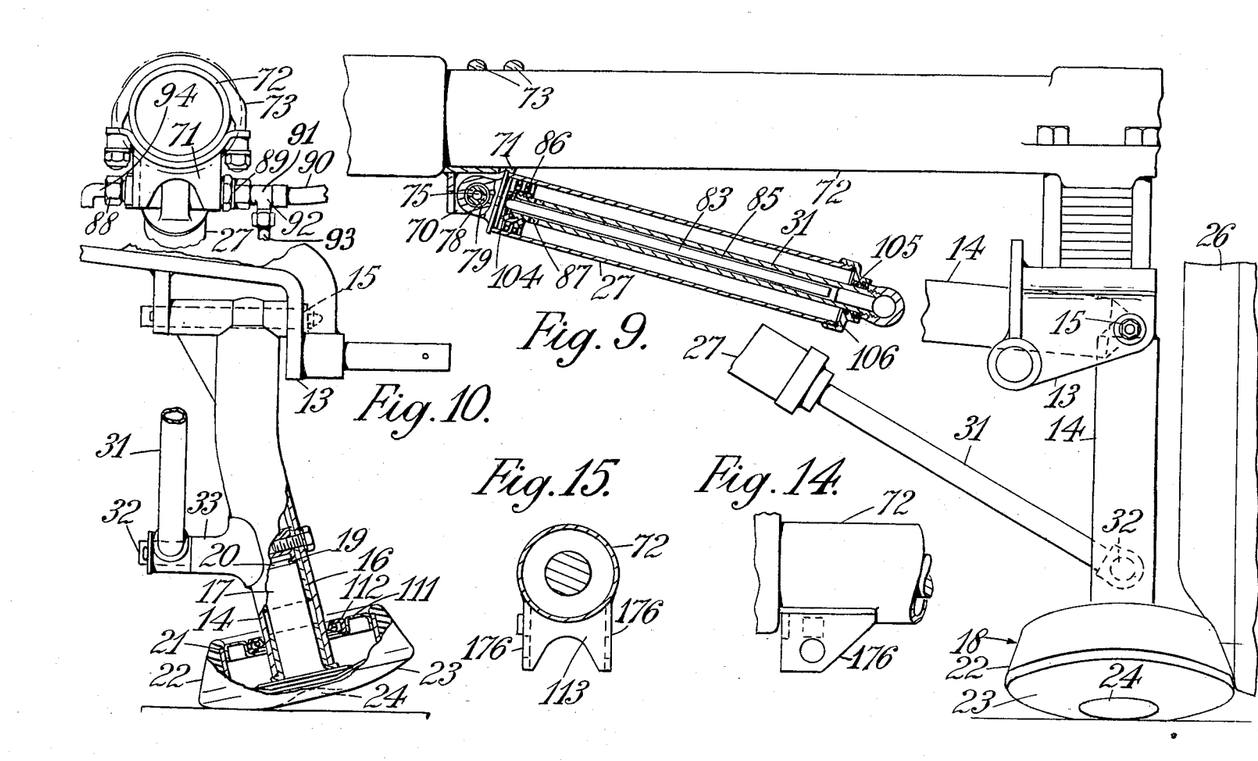
Figure 9 is a similar view to Figure 1 of a modified form of arrangement showing the righthand side of the vehicle only and showing to the right of the figure a part of the lifting mechanism in an extended position and showing to the left of the figure the ram in section and in the contracted position.
Figure 10 is a view showing the side elevation of the arrangement shown in Figure 9.
Figure 14 is a side elevation of an alternative form of anchorage for a cylinder on the back axle.
Figure 15 is a view looking to the right of Figure 14.

Swinging movement may be imparted to each said arm 14 by a hydraulically operated ram, the cylinder 27 of which is pivoted at 28 to swing about a fore and aft axis on a bracket 29 secured to the differential casing 30 and the piston rod 31 of which is pivotally connected at 32 to a suitable projection 33 on said arm, such as that shown in Figure 10. Each arm when in an elevated position lies substantially parallel or at a small angle to the back axle 11.

Instead of each said arm 14 carrying a single roller it may carry two rollers one in front of the other and having their inclined axes of rotation parallel to one another in which case the piston rod 31 of the ram is pivotally secured to the arm between the two rollers.

After each arm has been swung downwardly by the ram the roller or rollers will first come into contact with the ground and further movement will raise the wheels from the ground and yet further movement will bring the rollers into engagement with the tires of the wheels. The arms may be arranged to swing beyond dead center so that the weight of the vehicle will tend to maintain the rollers in contact with the tires. According to whether first gear or reverse gear is engaged the rear of the vehicle will be swung to the left or the right.

Figures 11, 12:
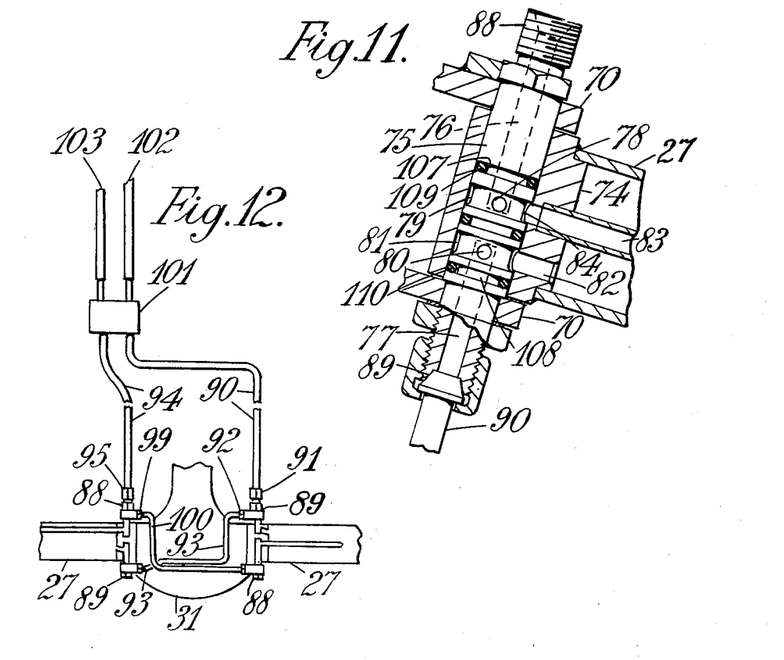
Figure 11 is a sectional plan view of the pivotal connection shown to the left of Figure 9.
Figure 12 is a diagrammatic view showing the interconnections between the pivotal connections of the two cylinders.

Figures 9 to 12 show details of a double acting hydraulically operating ram for swinging each arm 14 in an up and down direction, and also showing certain other modified details of construction. Instead of each ram cylinder being pivoted to a bracket secured to the differential casing as previously described, it is pivoted as shown at Figures 9 and 11 between the two lugs 70, formed on a fitting 71 which is secured to the axle casing 72 by suitable U bolts 73.

In order to simplify the piping for the feed and exhaust of hydraulic liquid, e.g. oil, to the two cylinders, the upper end of each cylinder is closed by a head 74 drilled to receive a pivot pin 75 secured between the aforesaid lugs 70. Each pivot pin is formed with two axially extending bores 76, 77 (Figure 11) which stop short of the center of the pin. The bore 76 communicates through holes 78 with a circumferential groove 79 formed on the pivot pin. The bore 77 communicates through a port 80 with another circumferential groove 81 on the pivot pin. This latter circumferential groove 81 communicates through a passage 82, with the upper end of the cylinder 27. The other circumferential groove 79 communicates with a pipe 83 which is secured as by brazing or soldering to a passage 84 in the head 74. The pipe 83 extends loosely through a bore 85 in the piston rod 31 so as to provide a passage between these parts and terminates short of the end of the cylinder 27. The hollow piston rod at its upper end has secured thereto a piston 86, and is provided with a number of ports 87 close to the underside of the head. The pivot pin is provided at the opposite ends with couplings 88, 89 which are cross connected in a manner shown in Figure 12, and may also be brought into communication either with the pressure side or suction side of a pump. In order to obtain a downward movement of the piston, the passages 77 and 82 are brought into communication with said pressure side through a down pipe 90. As will be seen from Figure 12 the coupling 89 associated with one ram cylinder is connected through a T connection 91 with the down pipe, one element 92 of the T connection 91 being connected by a cross pipe 93 with the coupling 89 of the other ram cylinder. In order to produce an upward movement of the piston, the passages 76, 84 and pipe 83 require to be connected to said pressure side and this is effected by an up pipe 94 which is connected through a branch of a T connection 95 to the coupling 88. The branch passage of the T connection is connected by a coupling 99 to a cross pipe 100 which is connected to the coupling part 88 of the right hand ram cylinder. The down and up pipes 90 and 94 are connected by a two way valve 101 with pressure and suction pipes 102, 103 of the hydraulic system. An oil sealing ring 104 is connected between the pipe 83 and the piston 86 and another oil sealing ring 105 between the piston 31 and the cap 106 which closes the lower end of the cylinder. The pivot pin 75 is provided with additional circumferential grooves 107 and 108 in which other oil sealing rings 109 and 110 are located. The piston rod 31 is pivotally connected at 32 to the arm 14.

The friction roller is provided with a seal with the arm 14, and a cup shaped shell 21 (see Figure 10) has secured to it a light steel pressing 111 which carries a conventional oil sealing ring 112 which engages the arm 14.

Figure 13:
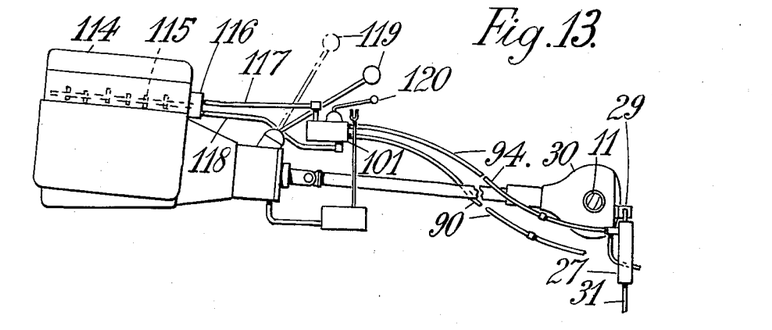
Figure 13 is a diagrammatic view showing the general layout of the apparatus in relation to the vehicle engine.

The general layout of the back axle casing, the differential casing 30, the down and up pipes 90, 94, and the control valve 101 is shown in Figure 13, the engine unit 114 may have attached to the rear end of its cam shaft 115 an oil pump 116 from which extend oil delivery and return pipes 117 and 118, these pipes lead to the two way control 101. The control valve 101 has a control knob 120 and is situated close to the gear box control lever 119. The control valve may be of the simple sliding valve type which in its central position returns the outlet from the pump directly back to it by the pipe 118.

If the control knob 120 of the valve is moved to the "down" position the output from the pump which may be capable of attaining about 600 lbs./sq. inch pressure is directed through the pipe 94 which connects via a flexible pipe and T-piece to the "down" unions of the two hydraulic cylinders. At the same time oil displaced from the lower parts of the cylinders is permitted to return through passages in the valve, to the pump, or to a reservoir, which may be integral with the pump or may be mounted separate from it.

When the control knob 120 of the valve is placed in the "up" position the reverse procedure takes place.

Where the control knob 120 of the valve and the gear control lever 119 are placed in close proximity it can easily be arranged that whereas the central and "up" position of the control knob can be attained at all times the "down" position of the control knob can only be attained when the gear lever is in low or reverse gear, or in the neutral space between these, i.e. it cannot be engaged when the vehicle is in any higher gear, permitting a road speed higher than that suitable for parking operations. This may be attained by simple physical baulking between the two control levers. Preferably where the left hand rule of the road applies the first gear imparts left hand motion to the vehicle and reverse gear right hand motion. Where the right hand rule applies the handing is preferably reversed.

Figures 14 and 15 show an alternative form of mounting for the head of the cylinder 27 on the axle casing 72, in this case there is welded to the underside of the axle casing a fitting comprising the two lugs 176 and the cross plate 113 which lugs are drilled to receive the pivot pin 75.

Figure 3:
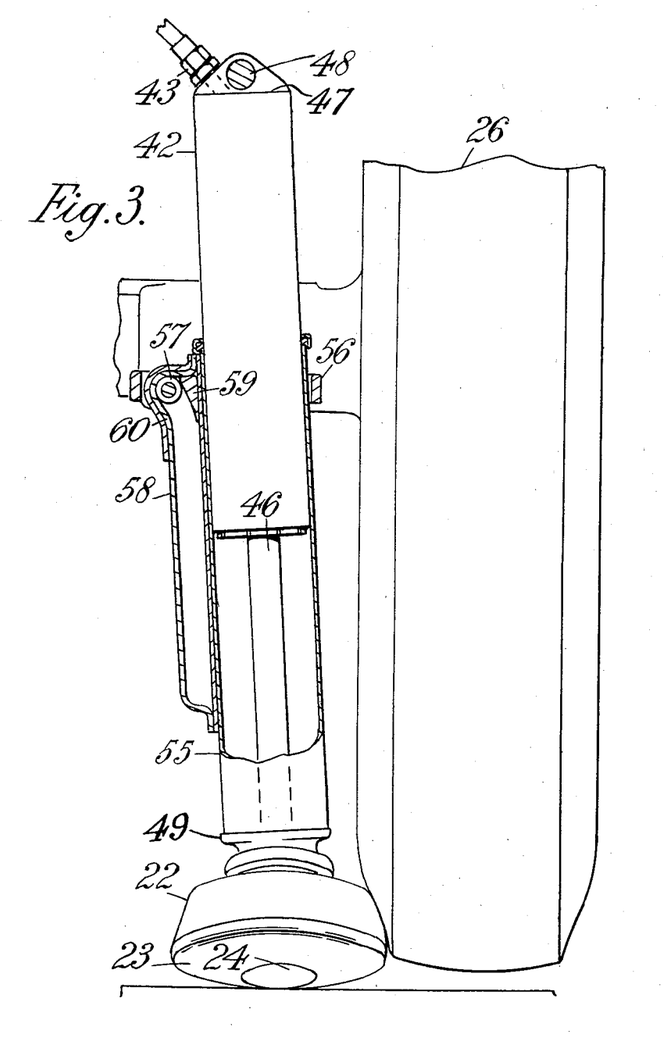
Figure 3 is a rear elevation partly in section of an alternative mechanism for raising and lowering a driving roller and showing the roller in its lower position.
Figures 4, 6:
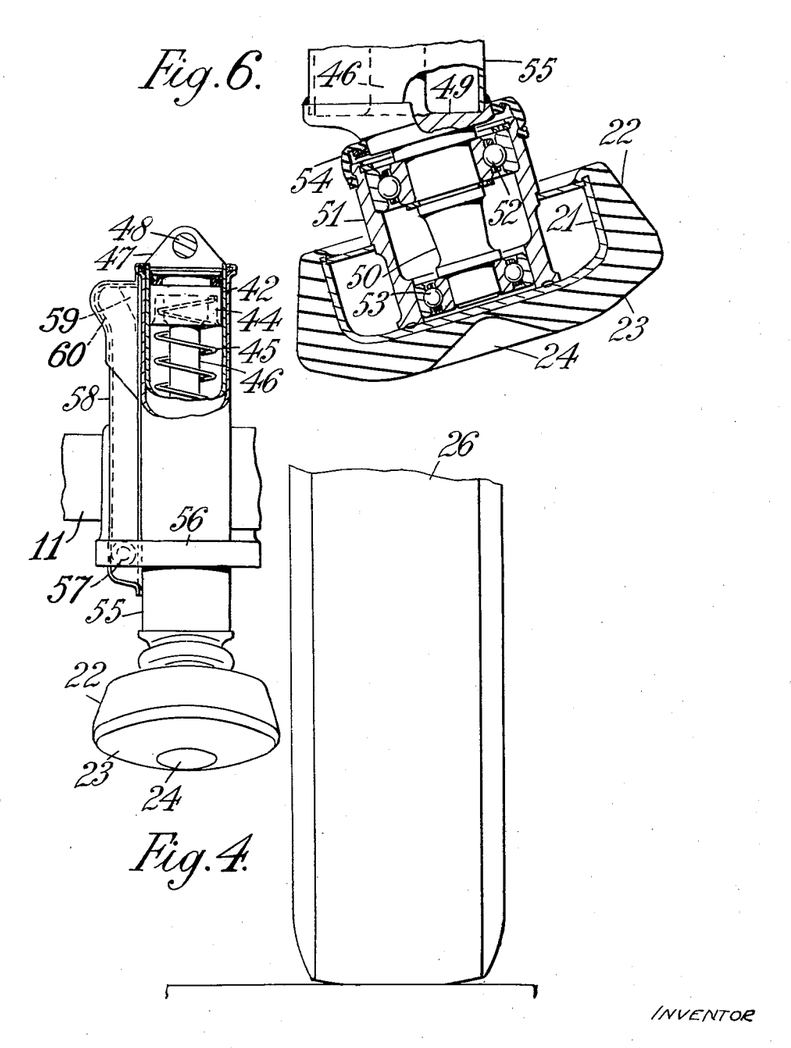
Figure 4 is a similar view to Figure 3 showing the roller in an elevated position.
Figure 6 is a sectional view of a roller mounting.
Figure 5:
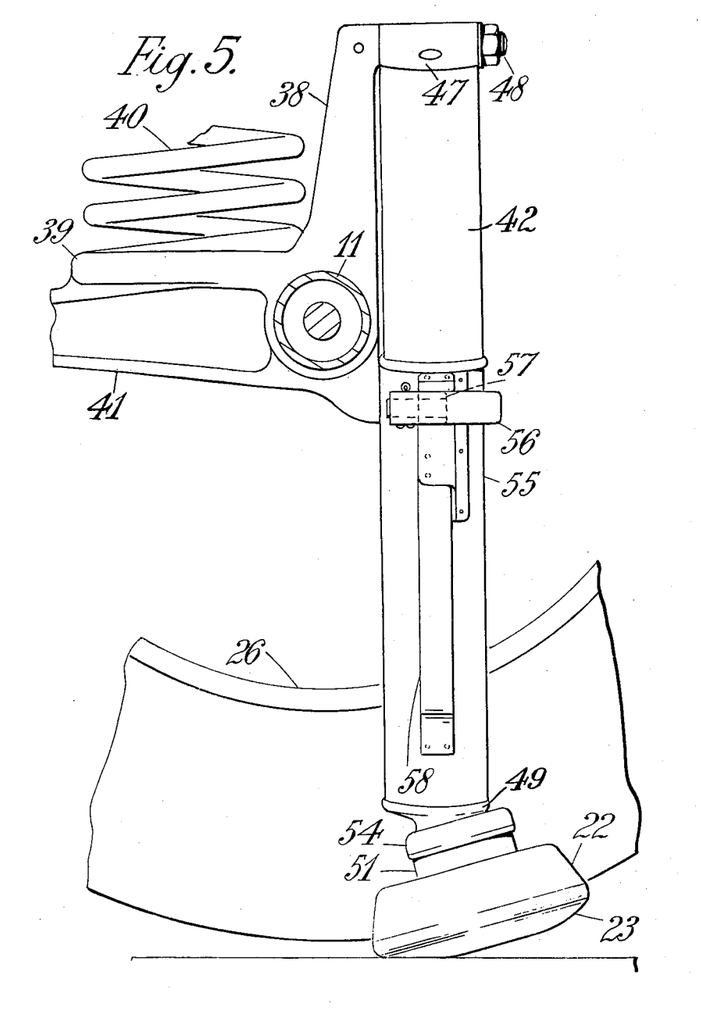
Figure 5 is a side elevation of a mechanism similar to that of Figure 3 but associated with a road wheel on the opposite side of the vehicle.

An alternative arrangement is shown in Figures 3 to 5 in which the mechanism is shown mounted on an extension 38 (Figure 5) of a pan 39 for a helical suspension spring 40 of known type. The pan is formed integrally with a radius arm 41 locating the rear axle. This form of the invention may be conveniently used with a vehicle having independent rear suspension as by swing axles.

Figure 3 shows the mechanism in an extended position having raised a road wheel 26 from the ground and having brought the under part 23, 24 of the roller into contact with the ground and its peripheral face 22 into contact with the side of the tire 26, whereas Figure 4 shows the mechanism in a contracted position.

Oil is supplied to the cylinder 42 of a ram through a pipe 43 and a two way control cock (not shown). Within the cylinder is located a piston 44 (Figure 4) to which is connected a piston rod 46. The piston is urged in an upward direction by a helical compression spring 45. The upper end of the cylinder is provided with a closure member 47 having a transverse hole formed therein through which extends a pivot pin 48 fixed to the upper extremity of the extension 38. As best seen in Figure 6 the lower extremity of the piston rod 46 is connected to a cup shaped member 49 from which extends downwardly a spindle 50 in an inclined manner. The spindle supports a hub member 51 by means of ball bearings 52 and 53. The hub is connected to the roller shell 21. A sealing member 54 is connected to the upper end of the hub.

The cup shaped member 49 has secured to it a sleeve 55 which extends loosely through a collar 56 formed on a part integral with the aforesaid spring pan 39. The collar 56 has mounted upon it a roller 57 which engages a guide 58 secured to the sleeve 55. During the last part of the downward travel of the sleeve 55 and guide 58 a hardened block 59 at the inner side of the guide is engaged by the roller 57 forcing the assemblage to right in Figure 3 and pressing the roller 22, 23 against the wall of the tire 26. The outer side of the guide is provided with a ramp 60 which acts on the roller 24 during the first part of the upward travel of the guide and sleeve restoring the sleeve 55 to a vertical position. It will be seen from Figure 5 that a position has been chosen for the roller 22, 23 in relation to the tire 26 such that the axis of rotation of the roller intersects the axis of the road wheel. This arrangement is the most favorable drive condition between the tire and the roller.

Figure 7:
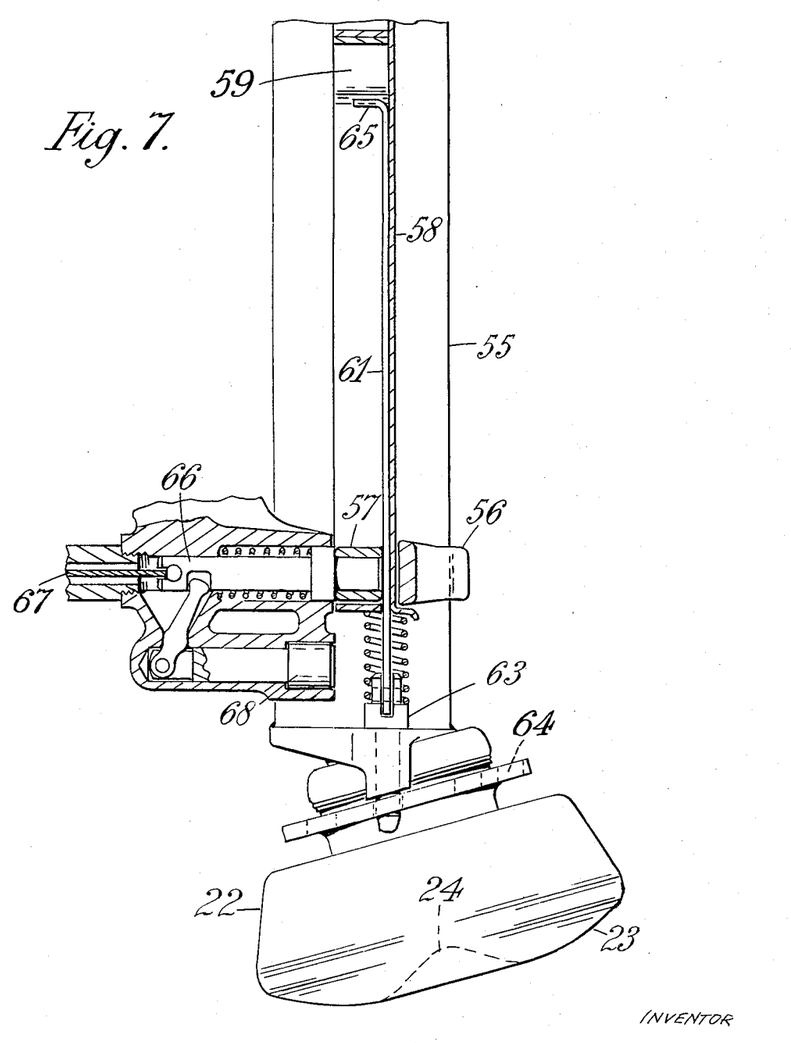
Figure 7 is a similar view to Figure 5 showing means for locking the roller against rotation and for holding the roller in contact with the tire.
Figure 8:
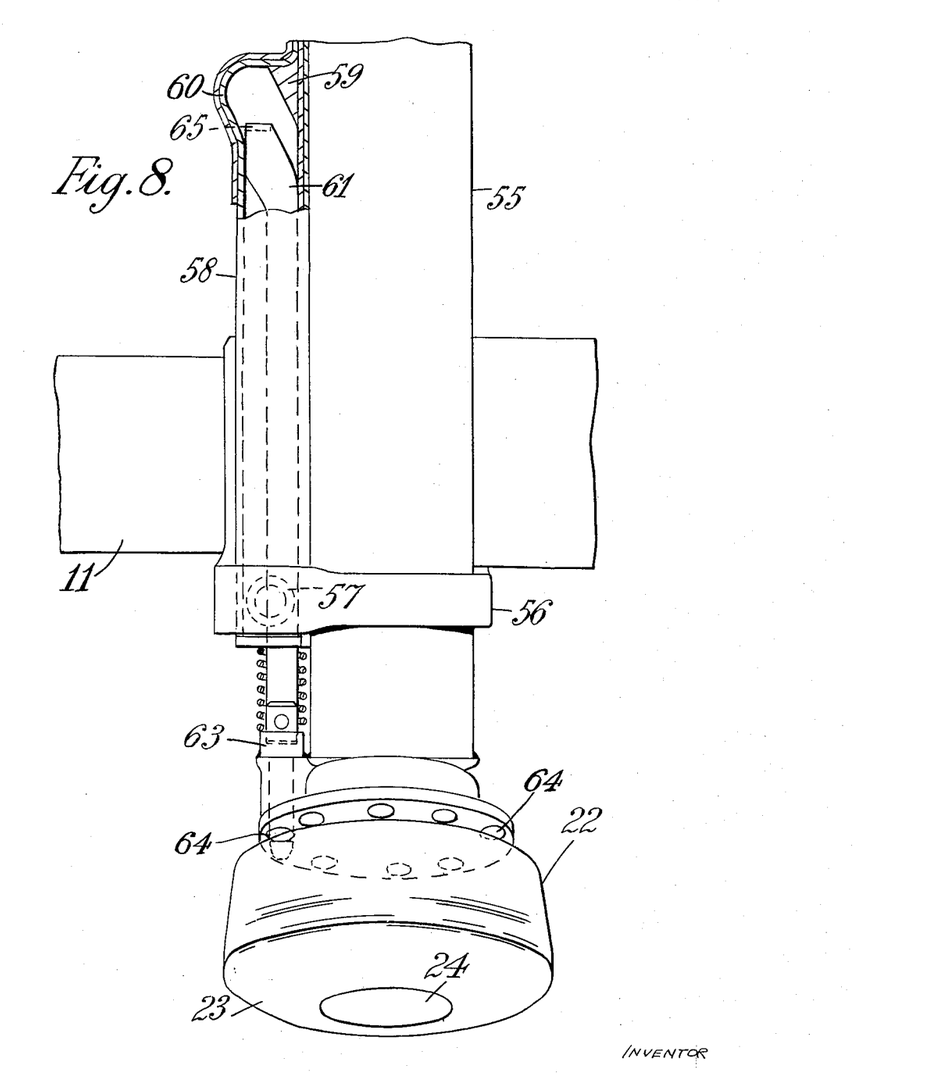
Figure 8 is a view looking from the left of Figure 7.

Referring to Figures 7 and 8 a rod or strip 61 may be disposed within the guide 58 and is attached at its lower end to a spring loaded plunger 63 which may be made to engage a hole in a ring of holes or slots 64 formed in a plate attached to the shell 21 of the rollers 22, 23, 24, whereby the roller may be locked against rotation.

The plunger may be lifted out of a hole in the plate by arranging the roller 57 to engage and lift a bent over portion 65 at the top of the aforesaid rod or strip 61. The roller 57 may be mounted on an axially mobile pin 66 so as to be retractable out of the path of movement of the bent over portion 65 of the strip and of the block 59. The pin may be moved by a cable 67 or the like in a direction away from the block 59 and thus the assemblage will not be urged towards the tire when it is lowered and the spring plunger will not be withdrawn from a hole in the plate. It is necessary that the part 56 shall be so shaped that it does not obstruct the ramp 60 (Figure 3) and preferably upon retraction of the roller 57 another pin 68 is arranged to enter the guide 58 lower down than the roller in order to maintain said sleeve 55 in a vertical position. The arrangement will then operate as a normal built in jack.

In all the arrangements referred to above the friction roller is arranged to engage a side wall of the tire near the outer periphery thereof and this part of the tire is well able to withstand any small amount of wear which may result. Alternatively however, the friction roller may be so shaped as to engage a part of the tread of the tire.

In yet another form of drive not illustrated the propeller shaft of the car might have secured to it a friction disc or drum and a second friction disc or drum might be arranged to be brought into and out of engagement with the first one and which second disc or drum is connected by suitable transmission to a roller which is lowered into and out of engagement with the road surface.

In any of the arrangements referred to above instead of a friction drive being employed the driving and driven elements might comprise two gear wheels and in the case where a friction roller engages the side wall of the tire the rubber covering of the roller might be formed with serrations which engage with similar serrations moulded on the wall of the tire.

Where the rams are energized hydraulically the hydraulic pressure may be provided by a servo pump driven say from the gear box or in any known manner, or the engine oil pump may provide oil under pressure to rams which exhaust back to the engine sump. Alternatively, the rams may be operated by air pressure or vacuum. In this case the action of the rollers and the arms when descending from and returning to their fully retracted position might tend to be sudden and noisy and it may be desirable to damp some part of the movement, as by restricting entry or evacuation of the air into the idle or working portion of the cylinder by means of a restricting needle attached to the piston.

Whether vacuum or pressure operated, it will be undesirable to maintain the actuating force while the device is out of use and thus the arm and roller assemblage may be forced into and retained by a spring clip upon full retraction, or a spring loaded locking plunger may be provided for holding the arm in a retracted position, which locking plunger may be withdrawn by the vacuum or pressure when the arm is to be lowered.

In the case where rams are employed for raising and lowering the rollers as in Figures 1 and 3, the last part of the retracted movement, i.e. that which raises the rollers clear of the road and brings them to their "parked position," can readily be operated by the return spring 45 (Figure 4) once the vacuum or other force which originally pushed down the arms is released, but a spring sufficiently powerful to draw the rollers inwards from their operating position might be cumbersome to install. It might also fail to operate in the case of the upper wheel when the vehicle was on a steep camber or side slope. It is preferable, therefore, that the cylinders should be double-acting, as shown in Figures 9 to 12, and be able positively to withdraw the rollers against the resistance of a side slope or an uneven road surface.

The term "hydraulic ram" used throughout the specification is intended to include rams operated by any fluid.

I claim:

1. A parking mechanism for a motor vehicle having road wheels comprising hydraulic rams on opposite sides of the vehicle each adjacent a road wheel, a pivotal connection between a part of each ram and the vehicle so that the ram swings about a fore-and-aft axis, and another part of each ram is reciprocable towards and away from the pivotal connection in an up-and-downward direction and is connected to a mounting for a roller having an axis of rotation inclined to the fore-and-aft axis of the vehicle and having an undersurface concentric with and transverse to said axis of rotation for engagement with the road and a different circumferential surface integral therewith and adapted to engage a part of the road wheel, and means between the reciprocable part of each ram and a fixed part of the vehicle constraining the integral undersurface and circumferential surface on the roller, when said reciprocable parts of the ram move downwards, to engage respectively and separately the ground and a part of the road wheel with the axes of the rollers on opposite sides of the vehicle inclined in opposite fore-and-aft directions.

2. A parking mechanism according to claim 1 wherein each hydraulic ram is double-acting so as to positively raise and lower each said roller and to move said roller into and out of engagement with the road wheel.

3. A parking mechanism according to claim 1, wherein each said hydraulic ram is double-acting and has a cylinder part which is the part pivotally connected to a part of the vehicle and a piston and piston rod which comprises the said another part and on which said roller is rotatably mounted, and the pivotal connection is a pivot pin provided with two separate passages adapted to be brought into communication with a source of fluid pressure and end in ports communicating respectively with passages leading to opposite sides of said piston.

4. A parking mechanism according to claim 1 wherein each hydraulic ram is double-acting and has a cylinder part which is the part pivotally connected to a part of the vehicle and a piston and piston rod which comprises the said another part and on which said roller is rotatably mounted, and the pivotal connection is a pivot pin provided with two separate passages adapted to be brought into communication with a source of fluid pressure and end in ports communicating respectively with passages leading to opposite sides of said piston, and wherein said piston rod is tubular and is provided with at least one port therein adjacent the underside of the piston and wherein the ports in the pivot pin communicate with a passage in a head closing the upper end of the cylinder and with a pipe extending from said head into the tubular piston rod and terminating close to the other closed end of the cylinder.

5. A parking mechanism according to claim 1 wherein each hydraulic ram is double-acting and has a cylinder part which is the part pivotally connected to a part of the vehicle and a piston and piston rod which comprises the said another part and on which said roller is rotatably mounted, and the pivotal connection is a pivot pin provided with two separate passages adapted to be brought into communication with a source of fluid pressure and end in ports communicating respectively with passages leading to opposite sides of said piston, and wherein said piston rod is tubular and is provided with at least one port therein adjacent the under side of the piston and wherein the ports in the pivot pin communicate with a passage in a head closing the upper end of the cylinder and with a pipe extending from said head into the tubular piston rod and terminating close to the other closed end of the cylinder, and further comprising a control valve for controlling the flow of fluid under pressure, two pipes connected to said control valve, one for supply of pressure fluid and the other for return of fluid, a T fitting having a branch and interposed between one pipe and one passage of one pin, means connecting the branch of the T fitting to one passage of the other pin, a second T fitting having a branch interposed between the other pipe and the other passage of the other pin, and means connecting the branch of the second T fitting to the other passage of said one pin.

6. A parking mechanism according to claim 1 wherein each hydraulic ram is double-acting and has a cylinder part which is the part pivotally connected to a part of the vehicle and a piston and piston rod which comprises the said another part and on which said roller is rotatably mounted, and the pivotal connection is a pivot pin provided with two separate passages adapted to be brought into communication with a source of fluid pressure and end in ports communicating respectively with passages leading to opposite sides of said piston, and wherein said piston rod is tubular and is provided with at least one port thereon adjacent the under side of the piston and wherein the ports in the pivot pin communicate with a passage in a head closing the upper end of the cylinder and with a pipe extending from said head into the tubular piston rod and terminating close to the other closed end of the cylinder, and further comprising a pump serving as said source of fluid pressure and having a suction intake and a pressure outlet, two pipes, one for supply of pressure fluid and the other for return of fluid, a two-way reversing valve connecting said pipes to the intake and outlet of said pump, a T fitting having a branch and interposed between one pipe and one passage of one pin, means connecting the branch of the T fitting to one passage of the other pin, a second T fitting having a branch interposed between the other pipe and the other passage of the other pin, and means connecting the branch of the second T fitting to the other passage of said one pin.

7. A parking mechanism according to claim 1 wherein said contraining means comprises a thrust mechanism operable upon downward movement of the reciprocal part for shifting the roller into engagement with the road wheel, and further comprising means for disabling the thrust mechanism to maintain the roller out of engagement with the road wheel when said roller is in engagement with the ground to enable the parking mechanism to be used as a jack.

8. A parking mechanism according to claim 1 wherein said constraining means comprises a thrust mechanism operable upon downward movement of the reciprocal part for shifting the roller into engagement with the road wheel, said thrust mechanism comprising a cam element and cam follower element, one of which elements is secured to a part of the vehicle and the other of which elements is attached to the reciprocal part of the ram, and further comprising means for effecting relative movement between the cam and cam follower elements so as to bring the path of movement of one clear of the other for rendering the thrust mechanism inoperative to enable the parking mechanism to be used as a jack.

9. A parking mechanism according to claim 1 wherein said constraining means comprises a thrust mechanism including a cam follower movably mounted on a part of the vehicle and a cam track attached to the reciprocal part of the ram, and further comprising means for moving the said cam follower out of the path of movement of the cam track for rendering the thrust means inoperative to enable the parking mechanism to be used as a jack.

10. A parking mechanism according to claim 1 wherein said constraining means for each ram comprises a thrust mechanism comprising a cam follower movably mounted on a part of the vehicle and a cam track attached to the reciprocal part of the ram, and further comprising a locking element mounted on the reciprocal part of the ram and movably relatively thereto into and out of locking engagement with a part of said roller, said locking element having an operating member engageable by said cam follower when the reciprocal part of the hydraulic ram is lowered, thereby releasing the roller for rotation, and means for moving said cam follower out of the path of movement of the cam track and operating member for the locking means, whereby the roller is locked and not moved toward the road wheel to enable the parking mechanism to be used as a jack.

11. A parking mechanism according to claim 1 wherein said constraining means for each ram comprises a thrust mechanism comprising a cam follower movably mounted on a part of the vehicle and a cam track attached to the reciprocal part of the ram, and further comprising a locking element mounted on the reciprocal part of the ram and movable relatively thereto into and out of locking engagement with a part of said roller, an operating member for said locking element engageable by said cam follower when the reciprocal part of the ram is lowered, thereby releasing the roller for rotation, and means for moving said cam follower out of the path of movement of the cam track and the operating member for the locking element, whereby the roller is locked and not moved toward the road wheel to enable the parking mechanism to be used as a jack, and wherein said cam track comprises a guide and wherein a guide-engaging member is interlinked with the movable cam follower whereby when the cam follower is moved out of the path of movement of said cam track and operating member for the roller-locking element, the guide-engaging member engages the guide and holds the roller and said track against movement towards the road wheel.

12. A parking mechanism according to claim 1, wherein the reciprocal part of the ram connected to the roller mounting is capable of sideways movement, and the constraining means comprises a thrust mechanism to impart said sideways movement during reciprocation, and further comprising means for disabling the thrust mechanism to maintain the roller out of engagement with the road wheel when said roller is in engagement with the ground to enable the parking mechanism to be used as a jack, and means for locking said roller against rotation when it is in engagement with the ground and out of engagement with the road wheel.

13. A parking mechanism according to claim 1, wherein the constraining means comprises an arm pivotally connected at one end to the fixed part of the vehicle and carrying the mounting for the roller at the other end.

14. A parking mechanism according to claim 13, wherein said part of the vehicle to which each hydraulic ram is pivotally connected is that part of the vehicle which carries the road wheels axle.

15. A parking mechanism according to claim 1, wherein the reciprocal part of the ram connected to the roller mounting is capable of sideways movement, and the constraining means comprises a thrust mechanism to impart said sideways movement during reciprocation, and further comprising means for locking said roller against rotation when the reciprocal part of the ram is in an elevated position.

16. A parking mechanism according to claim 15, wherein a part of said thrust mechanism is disposed in the path of movement of a part of said roller locking means whereby said locking means are released when said roller is brought into engagement with the road wheel.

17. A parking mechanism for a motor vehicle comprising, on each side of the vehicle, a hydraulic ram one part of which is pivotally connected to a part of the vehicle so that the ram may swing sideways in an up and down direction and another part of which ram is extensible and retractable with respect to the first part, at least one ground engaging roller rotatably mounted on the latter part of the ram, a cam and cam follower one of which is attached to a fixed part of the vehicle and the other to the extensible and retractable part of the ram whereby movement of that part imparts swinging movement to the parts of the ram, and which roller when the ram is extended engages the ground and lifts the vehicle wheel and also comes into driving relationship with the wheel with its axis of rotation inclined in a fore and aft direction.

18. A parking mechanism for a motor vehicle comprising, on each side of the vehicle, a hydraulic ram having a cylinder part pivotally connected to a part of the vehicle so that the ram may swing sideways in an up and down direction and having an extensible and retractible piston part on which is mounted at least one ground engaging roller to rotate about an axis which as viewed from the side of the vehicle is inclined to the longitudinal axis of the ram, a cam track connected to the said piston part of the ram and engaging a cam follower mounted on a fixed part of the vehicle whereby extensible movement of the piston part brings the roller into engagement with the ground and lifts the vehicle and also brings the roller into driving relationship with the wheel with its axis of rotation inclined in a fore and aft direction.

19. A parking mechanism for a motor vehicle comprising, on each side of the vehicle, a single acting hydraulic ram having a cylinder part pivotally connected to a part of the vehicle so that the ram may swing sideways in an up and down direction and having an extensible and retractable piston part, a fluid supply pipe communicating with said cylinder, a spring between the piston and the outer end of the cylinder, at least one ground engaging roller mounted on the piston part, said roller adapted to rotate about an axis which as viewed from the side of the vehicle is inclined to the longitudinal axis of the ram, a cam track connected to said piston part of the ram and engaging a cam follower mounted on a fixed part of the vehicle whereby extensible movement of the piston part brings the roller into engagement with the ground and lifts the vehicle and also brings the roller into driving relationship with the wheel with its axis of rotation inclined in a fore and aft direction.

20. A parking mechanism for a motor vehicle having road wheels comprising hydraulic rams on opposite sides of the vehicle each adjacent a road wheel, a pivotal connection between a part of each ram and the vehicle so that the ram swings about a fore-and-aft axis, and another part of each ram is reciprocable toward and away from the pivotal connection in an up-and-down direction and is connected to a mounting for a ground-engaging roller, and a cam mechanism between the reciprocable part of each ram and a fixed part of the vehicle adapted to impart a lateral thrust to the ram constraining the inegral parts of the roller when said reciprocable part moves downward, to engage both the ground and the side of a road wheel.

References Cited in the file of this patent

UNITED STATES PATENTS

| | | |
|---|---|---|
| 1,513,282 | Sheets | Oct. 28, 1924 |
| 2,090,768 | Thomas | Aug. 24, 1937 |
| 2,165,461 | Driesbach | July 11, 1939 |
| 2,364,553 | Rische | Dec. 5, 1944 |
| 2,685,934 | Coloma | Aug. 10, 1954 |
| 2,746,554 | Matthews | May 22, 1956 |
| 2,751,989 | Driesbach | June 26, 1956 |

FOREIGN PATENTS

| | | |
|---|---|---|
| 286,303 | Switzerland | Feb. 2, 1953 |
| 291,967 | Switzerland | Oct. 1, 1953 |